(12) United States Patent
Chizat

(10) Patent No.: US 7,257,180 B2
(45) Date of Patent: Aug. 14, 2007

(54) METHOD FOR RECEIVING A MESSAGE SIGNAL, RECEIVER, RECEIVING DEVICE AND MESSAGE TRANSMISSION SYSTEM FOR THIS

(75) Inventor: Romain Chizat, Stuttgart (DE)

(73) Assignee: Alcatel, Paris (FR)

( * ) Notice: Subject to any disclaimer, the term of this patent is extended or adjusted under 35 U.S.C. 154(b) by 689 days.

(21) Appl. No.: 10/295,827

(22) Filed: Nov. 18, 2002

(65) Prior Publication Data

US 2003/0095614 A1 May 22, 2003

(30) Foreign Application Priority Data

Nov. 19, 2001 (EP) .................................. 01440391

(51) Int. Cl.
*H04B 1/10* (2006.01)

(52) U.S. Cl. ...................... 375/350; 375/348; 375/285; 375/233; 375/346

(58) Field of Classification Search ................ 375/346, 375/348, 350, 285, 233
See application file for complete search history.

(56) References Cited

U.S. PATENT DOCUMENTS

| 5,513,215 | A | * | 4/1996 | Marchetto et al. .......... 375/233 |
| 5,659,576 | A | * | 8/1997 | Critchlow et al. .......... 375/219 |
| 6,084,929 | A | * | 7/2000 | Molnar et al. .............. 375/350 |
| 6,137,843 | A | | 10/2000 | Chennakeshu et al. |
| 6,674,820 | B1 | * | 1/2004 | Hui et al. .................... 375/346 |
| 6,680,969 | B1 | * | 1/2004 | Molnar et al. .............. 375/224 |
| 6,690,715 | B2 | * | 2/2004 | Webster et al. ............. 375/148 |

FOREIGN PATENT DOCUMENTS

| WO | WO 01/13537 A1 | 2/2001 |
| WO | WO 01/61950 A1 | 8/2001 |

* cited by examiner

*Primary Examiner*—Jean B. Corrielus
*Assistant Examiner*—Nader Bolourchi
(74) *Attorney, Agent, or Firm*—Sughrue Mion, PLLC

(57) ABSTRACT

During receiving of message signals, in particular radio signals, it is particularly important to free the receiving signal of interference, such as, e.g. noise or various kinds of interference. It would be desirable if the receiver had knowledge of the type of occurring interference in advance, before processing the received signal, in order therefore to be able to improve considerably signal processing, in particular equalisation and demodulation, of the receiving signal. A receiving method is here proposed, in which first the auto-correlation function of the spurious components contained in the received signal is estimated. Then the estimated auto-correlation function is compared with presettable sample functions and the sample auto-correlation function which most closely corresponds to the estimated auto-correlation function is chosen. Finally, by means of the selected sample function, further signal processing, in particular equalisation, of the received message signal is carried out. Therefore a matching sample function is determined in advance for the most strongly occurring spurious component.

13 Claims, 3 Drawing Sheets

METHOD FOR RECEIVING A MESSAGE SIGNAL, RECEIVER, RECEIVING DEVICE AND MESSAGE TRANSMISSION SYSTEM FOR THIS

BACKGROUND OF THE INVENTION

The invention is based on a priority application EP 01440391.9 which is hereby incorporated by reference.

With the invention described below a method for receiving a message signal, in particular a radio signal, is described, and also a receiver operating according to the method, a therewith equipped receiving device and a therewith equipped message transmission system.

SUMMARY OF THE INVENTION

The invention starts from conventional receiving methods in which in the receiver the received message signal is supplied to signal processing, in particular signal equalisation. In order to free the received message signal of interference it is known to have recourse to information gained from the demodulated signals of adjacent channels.

In receiving message signals, in particular radio signals, it is particularly important to free the received message signal of interference which may occur for instance owing to noise, various kinds of interference or other interfering influences. It would be desirable for the receiver to have knowledge of the kind of occurring interference in advance, before processing the received signal. In this way signal processing, in particular equalisation and demodulation, of the received signal could be improved.

Therefore it is the object of the invention to propose a method for receiving a message signal and devices suitable for this, in which freeing the receiving signal of occurring interference takes place by means of identification carried out in advance of at least the largest spurious component.

This object is achieved by a method with the features according to claim 1 and by a receiver for carrying out the method, by a therewith equipped receiving device and a therewith equipped message transmission system with the features according to one of the coordinate claims.

According to this, on receiving the message signal, first the auto-correlation function of the spurious components contained in the received signal is estimated. Then the estimated auto-correlation function is compared with presettable sample auto-correlation functions and the sample auto-correlation function which most closely corresponds to the estimated auto-correlation function is chosen. Finally, by means of the selected sample auto-correlation function, further signal processing of the received message signal is carried out.

By these measures a characteristic auto-correlation function, which is valid as a sample, is selected for the most strongly occurring interference. In other words: a matching sample auto-correlation function is estimated in advance for the most strongly occurring spurious component, which describes the dominant type of interferer occurring on the transmission channel afflicted with interference, which can then be used as a basis for further signal processing. Further signal processing is, for example, equalisation of the message signal, which is then carried out using the selected sample function. The invention is namely based on the knowledge that very frequently the message signal is adulterated for the most part by only one single typical kind of interference and, if this type of interferer is known, receiving the message signal can be considerably improved. The presettable sample auto-correlation functions accordingly characterise different types of interferer, i.e. the kinds of interference typically occurring in the message transmission system. Accordingly the presettable sample auto-correlation functions can also be designated as characteristic functions of the possible interference candidates, of which the function of the candidate which most closely corresponds to the actual receiving circumstances is selected.

The invention can be implemented with extremely small computer outlay and additionally irrespective of the type of modulation used. The method according to the invention is preferably introduced after the channel impulse response of the message transmission channel has been estimated and before subsequent equalisation, in particular decision feedback equalisation, of the message signal takes place.

Particularly advantageous configurations of the invention emerge from the subordinate claims:

According to these it is particularly advantageous for receiving a radio signal, in particular a mobile radio signal, if the signal processing, which takes place by means of the selected sample auto-correlation function, comprises an estimation of the channel impulse response and/or filtering and/or feedback equalisation of the radio signal. This means that by means of the selected sample auto-correlation function both estimation of the channel impulse response and filtering and equalisation of the radio signal are improved. In the case of estimation of the channel impulse response this is preferably done by matching the estimation interval (CIR length). For this the estimation parameters, such as, e.g., the threshold value, are optimised, so the best parameters can be used for each type of interferer. If the system is constructed, for example, in such a way that some channel lengths are associated with a particular type of interferer (in the GSM radio model "hilly terrain" large channel lengths are usually associated with noise), the length of the estimation interval (CIR length) can be optimised depending on the type of interferer. In the case of filtering, and also in the case of feedback equalisation of the radio signal, corresponding coefficients are matched to the determined and selected sample auto-correlation function.

It is additionally of advantage if the presettable sample auto-correlation functions describe those disturbances which occur in typical radio channel models afflicted with interference. Of particular note in this context are radio channel models in which white noise and/or adjacent channel interference and/or co-channel interference occurs. Corresponding sample auto-correlation functions are preset for these various cases. The subsequent selection of the best matching sample auto-correlation function is limited by the number of preset functions and can accordingly be carried out very quickly. The sample auto-correlation functions herein correspond to the spectra or power spectral density functions of the various radio channel interference signals.

It is of further advantage if the amount of cross correlation formed between the respective sample auto-correlation functions and the estimated auto-correlation function is drawn on as a criterion in the selection of sample auto-correlation function.

It is also of particular advantage if the received message signal contains a training sequence and if the channel impulse response is estimated by evaluating this received training sequence.

BRIEF DESCRIPTION OF THE DRAWINGS

The invention and the advantages emerging from it are described below in greater detail using an embodiment example and with the aid of the following schematically illustrated drawings.

In FIG. 1 in the flow process diagram a method 100 is illustrated which serves for receiving a message signal. After the method has begun in step S, in a first step 110 a channel estimation (CIR) of the received message signal R is carried out. Then in step 120 follows estimation of the auto-correlation function ACF for the spurious components in the received message signal R. This estimated auto-correlation function ACF is then compared with various sample auto-correlation functions in a following step 130. In this example the following five sample functions are preset (see also on this FIG. 3).

Sample auto-correlation function WN1 describes interference of the message transmission channel by a filtered white noise (pink noise). Function WN2 describes a case in which an ideal white noise occurs, as is the case if the channel estimation done in step 110 could not be correctly carried out. Function AC11 in turn describes the situation where, on an adjacent channel, in this case on the left adjacent channel, an adjacent signal occurs which causes adjacent channel interference. Function AC12 describes corresponding interference on the right adjacent channel. Finally, function CC1 describes interference on the same channel via which the message signal is transmitted (co-channel interference).

However, in so far as none of the above described typical interferers according to sample functions WN1, WN2, AC11, AC12, CC1, is identified as dominant, a special case is assumed, which can be described, for example, by an interfering sine function SIN. It is, however, irrelevant to describe the special case by a concrete function. It is rather more essential that the special case is established per se, in other words that it is established that none of the usual sample functions can describe the occurring interference accurately enough. This is preferably established using a threshold value (of e.g. 0.5), which selects the results from the cross correlations. In so far as all the results are below this threshold value, there is no dominant sample function which could be regarded as the best candidate.

So in this special case it is not a sample function, e.g. function AC12, that is used but the actually estimated auto-correlation function ACF.

Figure 3:
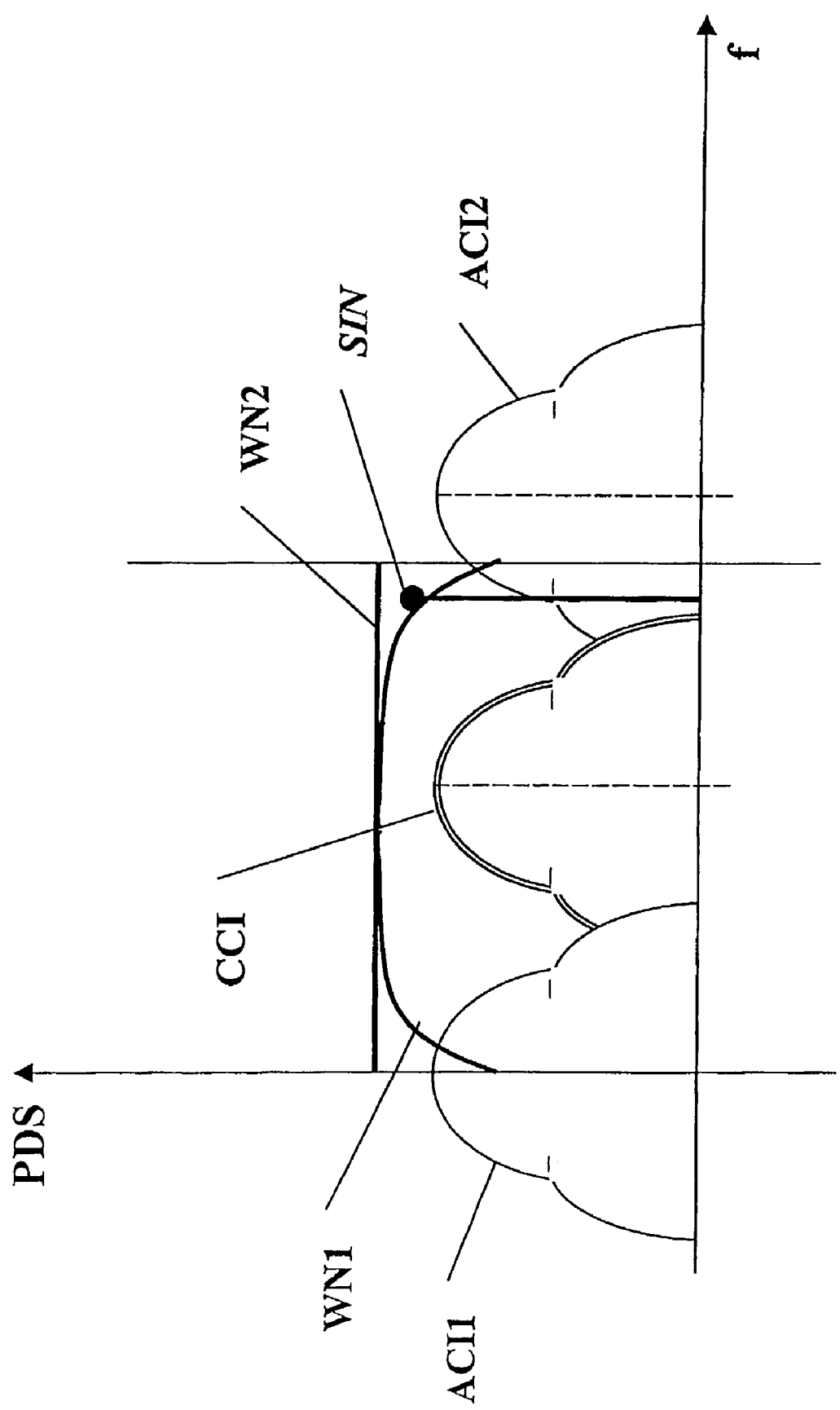
FIG. 3 illustrates schematically some typical kinds of interference occurring in the power spectrum of the message signal.

The various individual sample auto-correlation functions which reproduce the typical causes of interference and also a sine function which is intended to represent the special case symbolically are illustrated in greater detail in FIG. 3.

There the power density spectrum PDS is plotted against the frequency f. In the centre of the figure is the area of the transmission channel with the spectrum of the message signal (wanted signal) to be transmitted. The various interferers are located in the immediate vicinity of or in the same area as the wanted signal. The two interferers WN1 and WN2, characterised by white or filtered white noise, completely overlap the area of the transmission channel. The individual interferer SIN, which reproduces a special singular type of interference as a special case, occurs in only a very narrow area of the band. Finally, the interferences caused by adjacent channels are characterised by functions AC11 and AC12, in other words by transmission functions which are partially heterodyned with the active band and thus cause left or right side adjacent channel interference.

Figure 1:
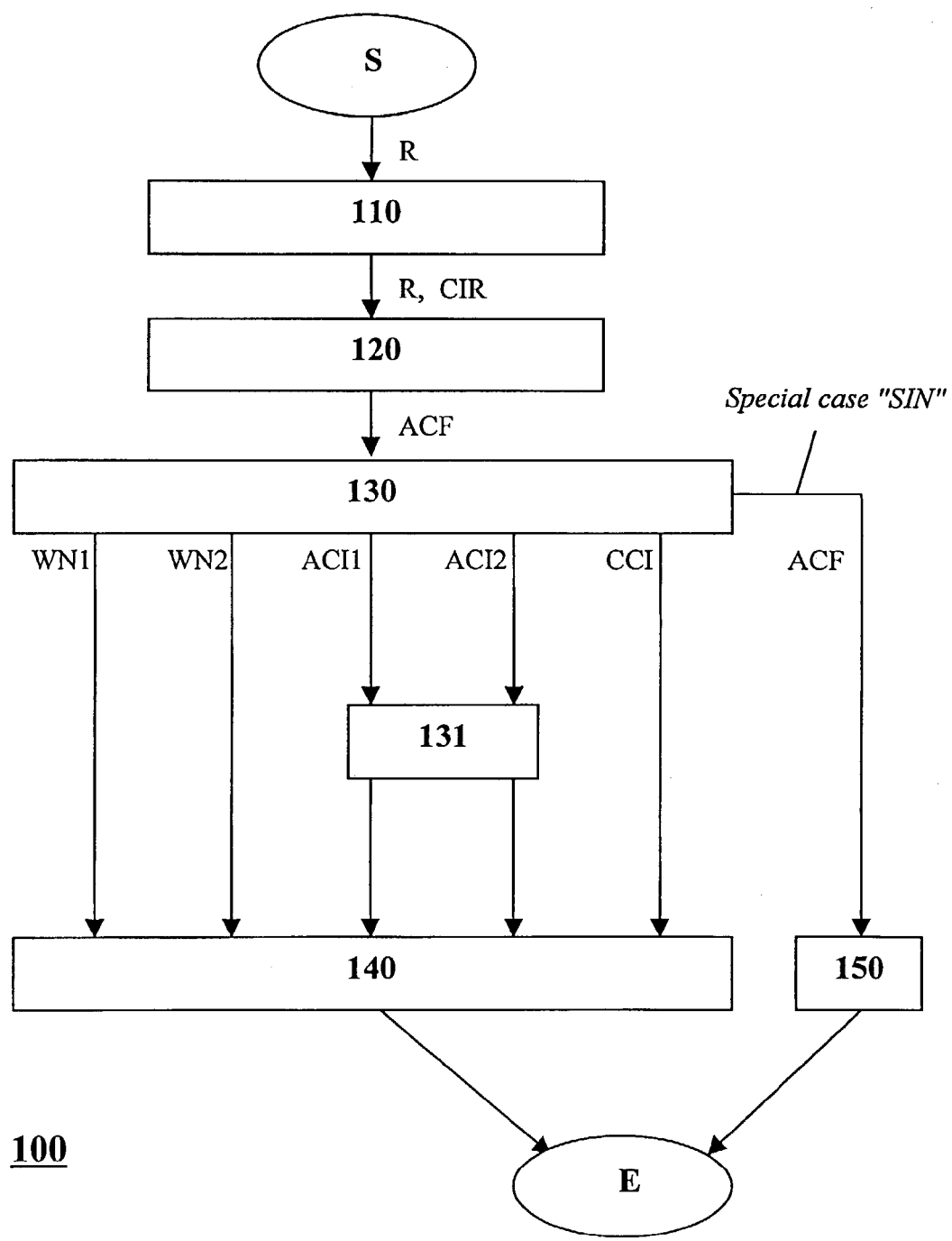
FIG. 1 shows the flow process diagram of a method according to the invention.

Depending on the type of interference occurring the method (see FIG. 1) is now continued: in order to identify the interferer probably occurring most strongly the auto-correlation function ACF estimated in step 120 is compared with the various sample auto-correlation functions WN1, WN2, AC11, AC12, CC1. Comparison takes place by forming cross-correlation products between the estimated auto-correlation function and these various sample functions. The sample function which comes closest to the estimated auto-correlation function, i.e. which correlates most to the estimated auto-correlation function, is used in the further method.

If, for example, it is a case of adjacent channel interference, sample function AC11 or AC12 is used, the received message signal being filtered in a step 131 by means of this sample function. Only after this does equalisation of the message signal take place in a step 140. If there is for the most part another type of interference present, the corresponding sample function WN1, WN2 or CC1 is used, equalisation of the message signal then being carried out by means of this sample function.

If, however, by comparison with a threshold value it is identified that none of the sample functions coincides (correlates) sufficiently strongly with the estimated auto-correlation function, this is a special case. This could occur, for example, owing to a dominant sine interference SIN. In so far as a special case is identified, it is not one of the sample functions that is selected, but the actually estimated auto-correlation function is used for further signal processing. Corresponding to this example in a step 150 equalisation of the message signal therefore takes place by means of the actually estimated auto-correlation function which emerged from step 120.

To summarise: in step 140 equalisation of the message signal R is carried out by means of the respectively selected sample function (e.g. with WN2 or with the filtered AC11); on the other hand in the special case according to step 150 equalisation is carried out with the actually estimated auto-correlation function ACF. The method finally ends with step E.

The equalisation of the received message signal here carried out preferably takes place in the form of decision feedback equalisation, in which the coefficients used are set by means of the selected sample function. Specifically this means that in the equalisation stage the coefficients of the forward filter, also called "A filter" for short, are matched to the determined sample auto-correlation function.

Figure 2:
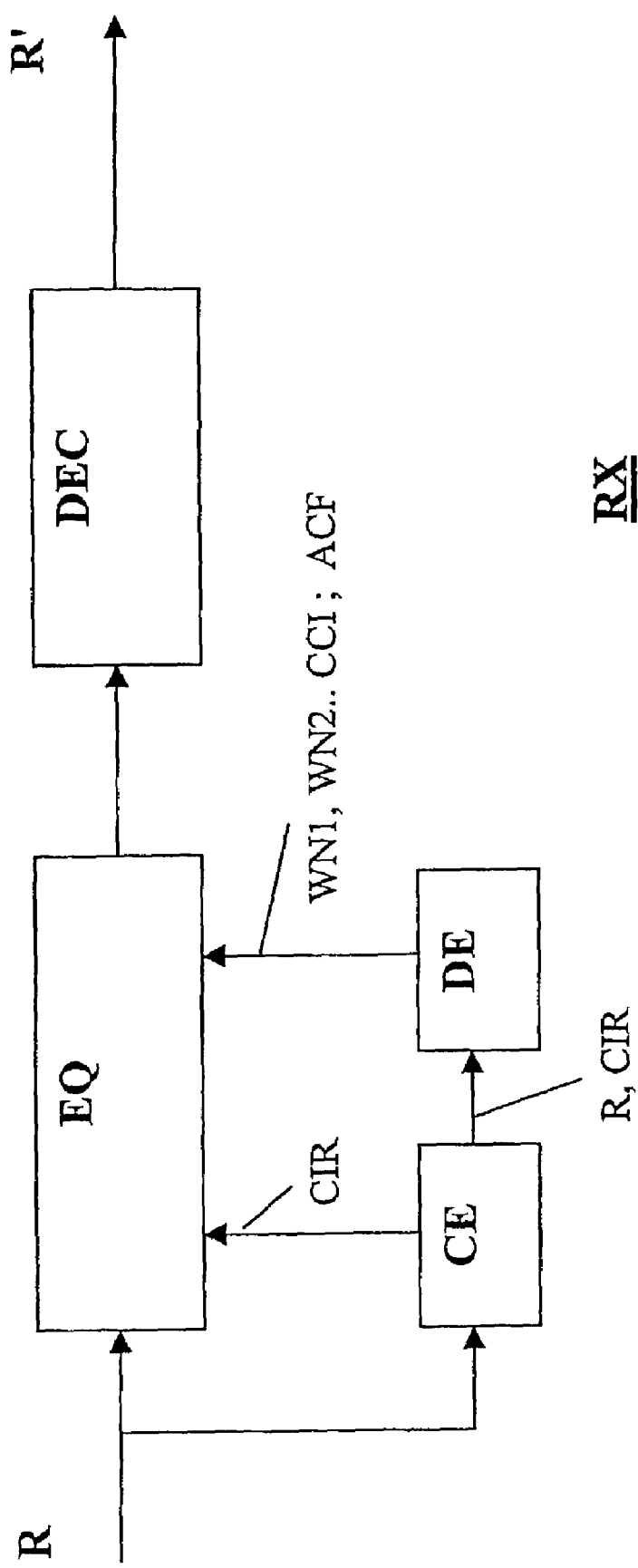
FIG. 2 shows schematically the structure of a receiver according to the invention.

FIG. 2 shows the basic structure of a receiver RX according to the invention, containing an equalisation stage EQ and a decoder DEC connected downstream as well as a channel estimation stage CE and an interference estimation stage DE, which set the coefficients in the equaliser EQ. For this purpose the received message signal R is applied not only to the input of the equaliser EQ, but also to the input of the channel estimation stage CE, which in turn is connected downstream of the interference estimation stage DE. The channel estimation stage CE determines the channel impulse response and forwards this result to the equaliser EQ. The channel impulse response is also forwarded to the interfer ence estimation stage DE, so that noise suppression can be carried out there with low outlay.

The interference estimation stage DE determines from the received receiving signal R the auto-correlation function of the spurious components by estimation and compares this estimation with the preset sample auto-correlation functions. The selected sample correlation function which reproduces the best candidate is used for setting the equaliser coefficients.

The estimation of the channel impulse response carried out in stage CE takes place by evaluating a training sequence contained in the receiving signal R, which contains, for example, a 26 bit long sample. The process carried out in the interferer estimation stage DE contains, among other things, the formation of cross-correlation functions, in order to establish with which of the sample auto-correlation functions the estimated auto-correlation function most coincides.

The invention is therefore suitable both for improving estimation of the channel impulse response and for optimising filtering and equalisation of the received message signal itself. The invention is particularly suitable for receiving message signals with strong interference, as occur particularly in radio transmission systems. Of particular note in this context are mobile radio systems, such as the GSM (Global System for Mobile Communications) or the UMTS (Universal Mobile Telecommunications System), in which the most varied forms of channel interference can occur, which according to the invention are taken into account in each case by a corresponding sample auto-correlation function. It is therefore particularly advantageous to implement the invention in mobile radio receivers, both within the radio base stations and within the mobile stations, also called mobile terminals. Correspondingly, the claimed receiver can be constructed as a mobile radio receiver. And the claimed receiving device can be constructed as a radio base station or else as a mobile station.

Application of the invention is also not confined to specific modulation methods, but the invention is particularly suitable for digital modulation methods in which training sequences are used. Trials have shown that by using the invention the signal-to-noise ratio in the receiving signal is improved by approximately 3 to 4 dB. In association with the transmission of mobile radio signals, sample auto-correlation functions can be used which reproduce typical situations, such as, for example, radio transmission in country areas, in hilly or flat terrain or in inner city areas. Therefore the most varied radio transmission models can be drawn on as default for the sample auto-correlation functions. It has been proved that in almost all cases the invention effects a considerable improvement in the signal-to-noise ratio; if, however, the case were to occur that none of the preset sample auto-correlation functions unequivocally characterises the occurring interference, i.e. no unequivocal type of interference can be identified, it is advantageous that the actually estimated auto-correlation function is then drawn on for optimising the following signal processing, in particular equalisation of the message signal.

As well as the embodiment example described, further examples are conceivable in the most varied fields of application, in particular also in the area of broadband and high-rate message transmission, such as in the area of directional radio transmission, satellite radio transmission or optical message transmission, for instance.

The invention claimed is:

1. A method for receiving a message signal comprising:
   estimating auto-correlation function of spurious components contained in said received message signal;
   comparing the estimated auto-correlation function with presettable sample auto-correlation functions;
   selecting sample auto-correlation function of said sample auto-correlation functions, which most closely corresponds to the estimated auto-correlation function; and
   carrying out signal processing of the received message signal utilizing the selected sample auto-correlation function,
   wherein the presettable sample auto-correlation functions describe various kinds of interference which occur in radio channel models afflicted with interference, and wherein the sample auto-correlation functions comprise at least one of: a sample auto-correlation function for radio channel models afflicted with white noise, a sample auto-correlation function for radio channel models afflicted with adjacent channel interference, and a sample auto-correlation function for radio channel models afflicted with co-channel interference.

2. The method according to claim 1, wherein the received message signal is a radio signal, and wherein the signal processing of the radio signal comprises an estimation of the channel impulse response carried out by at least one of the selected sample auto-correlation functions, filtering, and feedback equalization of the radio signal.

3. The method according to claim 1, wherein said selecting comprises selecting the sample auto-correlation function, which has the greatest cross-correlation with the estimated auto-correlation function.

4. The method according to claim 1, in which none of the sample auto-correlation functions are selected if its cross-correlations with the estimated auto-correlation function is below a presettable threshold value.

5. The method according to claim 4, wherein, instead of one of the sample auto-correlation functions, the estimated auto-correlation function is selected and said signal processing of the received message signal utilizes the selected estimated auto-correlation function.

6. The method according to claim 1, wherein the received message signal comprises a training sequence and wherein the channel impulse response is estimated by evaluating the received training sequence.

7. The method according to claim 1, wherein the received message signal is a mobile radio signal.

8. The method according to claim 1, wherein, when none of correlation values obtained from said comparing is above a predetermined threshold, determining that no dominant interferer is present and selecting the estimated auto-correlation function during said selection and processing the received message signal utilizing the selected estimated auto-correlation function.

9. The method according to claim 1, wherein said processing comprises filtering and feedback equalization of the received message signal and wherein, during said processing, coefficients in said filtering and said equalization are matched up to the selected auto-correlation function.

10. The method according to claim 9, further comprising:
    estimating channel of the received message signal, and
    wherein said estimating of the auto-correlation function is based on the channel estimation, and
    wherein length of channel interval is optimized based on said selected auto-correlation function, which indicates type of interference present in the received message signal.

11. A message transmission system comprising:
at least one receiving device,
wherein the receiving device comprises:
- a first signal estimation module, receiving a message signal and estimating auto-correlation function of spurious components contained in the received message signal,
- a comparison and selection module comparing the estimated auto-correlation function with presettable sample auto-correlation functions and selecting the sample auto-correlation function which most closely corresponds to the estimated auto-correlation function, and
- at least one signal processing block processing the received message signal utilizing the selected sample auto-correlation function, wherein the presettable sample auto-correlation functions describes various kinds of interference which occur in radio channel models afflicted with interference, and wherein the sample auto-correlation functions comprise at least one of: a sample auto-correlation function for radio channel models afflicted with white noise, a sample auto-correlation function for radio models afflicted with adjacent channel interference, and a sample auto-correlation function for radio channel models afflicted with co-channel interference.

12. The message transmission system according to claim 11, wherein the first signal estimation module estimates the auto-correlation function of only the spurious components contained in said received message signal.

13. The message transmission system according to claim 11, wherein the transmission system is a global system for mobile communications or universal mobile telecommunications system.

* * * * *